US005771744A

United States Patent [19]

Canova et al.

[11] Patent Number: 5,771,744

[45] Date of Patent: Jun. 30, 1998

[54] DEVICE FOR SUBJECTING A SHAFT TO A COMBINED SIMPLE ROTATION AND ALTERNATING ROTATION OF LIMITED EXTENT ABOUT ITS OWN AXIS

[75] Inventors: Enrico Canova, Ponte S. Nicolo'; Tiziano Salviato, Dolo, both of Italy

[73] Assignee: Holmac S.a.s. di Gastaldi Christian E C., Padova, Italy

[21] Appl. No.: 614,414

[22] Filed: Mar. 12, 1996

[30] Foreign Application Priority Data

Mar. 14, 1995 [IT] Italy ................................ PD950018 U

[51] Int. Cl.[6] ................................ B06B 1/10; F16H 33/06

[52] U.S. Cl. ................................ 74/411; 74/425; 172/40; 464/61; 464/73

[58] Field of Search ........................ 74/411, 425; 172/40, 172/92, 94; 464/61, 62, 73, 76, 81; 366/73, 76.1

[56] References Cited

U.S. PATENT DOCUMENTS

| | | | |
|---|---|---|---|
| 1,510,943 | 10/1924 | Kjelsberg | 464/81 |
| 2,005,974 | 6/1935 | Hutchison . | |
| 3,461,969 | 8/1969 | Bodine | 172/40 |
| 4,616,713 | 10/1986 | Shattuck | 172/40 X |
| 4,871,027 | 10/1989 | Lindstrom et al. | 172/40 |
| 5,146,804 | 9/1992 | Carmillet | 74/411 |
| 5,173,716 | 12/1992 | Tetsuka | 464/61 |

FOREIGN PATENT DOCUMENTS

| | | | |
|---|---|---|---|
| 0 775 014 | 12/1934 | France . | |
| 1 148 842 | 12/1957 | France . | |
| 1 604 413 | 11/1971 | France . | |
| 120428 | 5/1989 | Japan | 464/61 |
| 0 418 783 | 10/1934 | United Kingdom . | |

*Primary Examiner*—Charles A. Marmor
*Assistant Examiner*—Troy Grabow
*Attorney, Agent, or Firm*—Guido Modiano; Albert Josif

[57] ABSTRACT

The device has springs arranged diametrically opposite with respect to a shaft that is coupled to a generator of torsional vibrations. The springs are rigidly coupled between first supporting elements that rotate with the shaft and second supporting elements that are rigidly coupled to a gear system that is freely mounted on the shaft. The gear system is coupled to a motor for actuating rotation of the shaft.

20 Claims, 3 Drawing Sheets

DEVICE FOR SUBJECTING A SHAFT TO A COMBINED SIMPLE ROTATION AND ALTERNATING ROTATION OF LIMITED EXTENT ABOUT ITS OWN AXIS

BACKGROUND OF THE INVENTION

The present invention relates to a device for subjecting a shaft to a combined simple rotation and alternating rotation of limited extent about its own axis.

It is particularly but not exclusively applicable to a mechanical system for eradicating plants.

In order to remove plants from the soil it is usually necessary to ensure that an appropriate sod of said soil remains together with the roots.

This so-called balling and burlapping operation currently entails the use of an arc-shaped blade that is subjected to a combined simple rotation and alternating rotation of limited extent about its own axis.

The simple rotation, combined with the alternating vibratory motion, allows the blade to penetrate the soil and to isolate the sod from said soil.

Each one of the two movements is actuated by corresponding actuation means, for example a hydraulic motor for rotary motion and a torsional oscillation generator for vibratory motion.

The problem currently affecting these devices is due to breakages which occur in the parts associating the shaft that supports the blade with the actuation means.

SUMMARY OF THE INVENTION

A principal aim of the present invention is to provide a device for subjecting a shaft to a combined simple rotation and alternating rotation of limited extent about its own axis that is not subject to breakages due to fatigue of parts during use.

A consequent primary object is to provide a device that can be conveniently installed on equipment for performing the balling and burlapping of plants.

Another object is to provide a device that can be manufactured with conventional equipment and facilities.

With this aim, these and other objects in view, there is provided a device comprising elastic means that are arranged diametrically opposite with respect to a shaft that is coupled to a generator of torsional vibrations, said elastic means being rigidly coupled between first supporting elements that rotate with said shaft and second supporting elements that are rigidly coupled to a gear system that is freely mounted on said shaft and is coupled to means for actuating rotation.

BRIEF DESCRIPTION OF THE DRAWINGS

Further characteristics and advantages of the invention will become apparent from the following detailed description of an embodiment thereof, illustrated only by way of non-limitative example in the accompanying drawings, wherein.

DESCRIPTION OF THE PREFERRED EMBODIMENTS

With reference to the above figures, a shaft 11 is rotatably coupled to a frame 10, and a curved blade, not shown in the figures, for performing for example the balling and burlapping of plants is conveniently fixed on the head 11*a* of said shaft.

Figure 1:
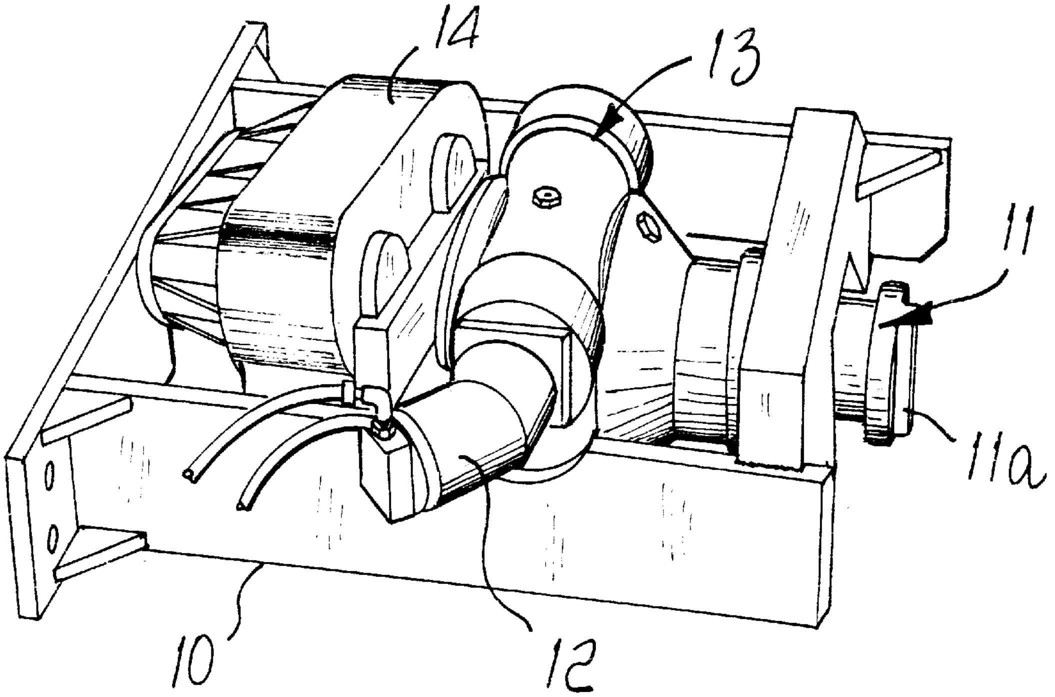
FIG. 1 is an external perspective view of the device.
Figure 2:
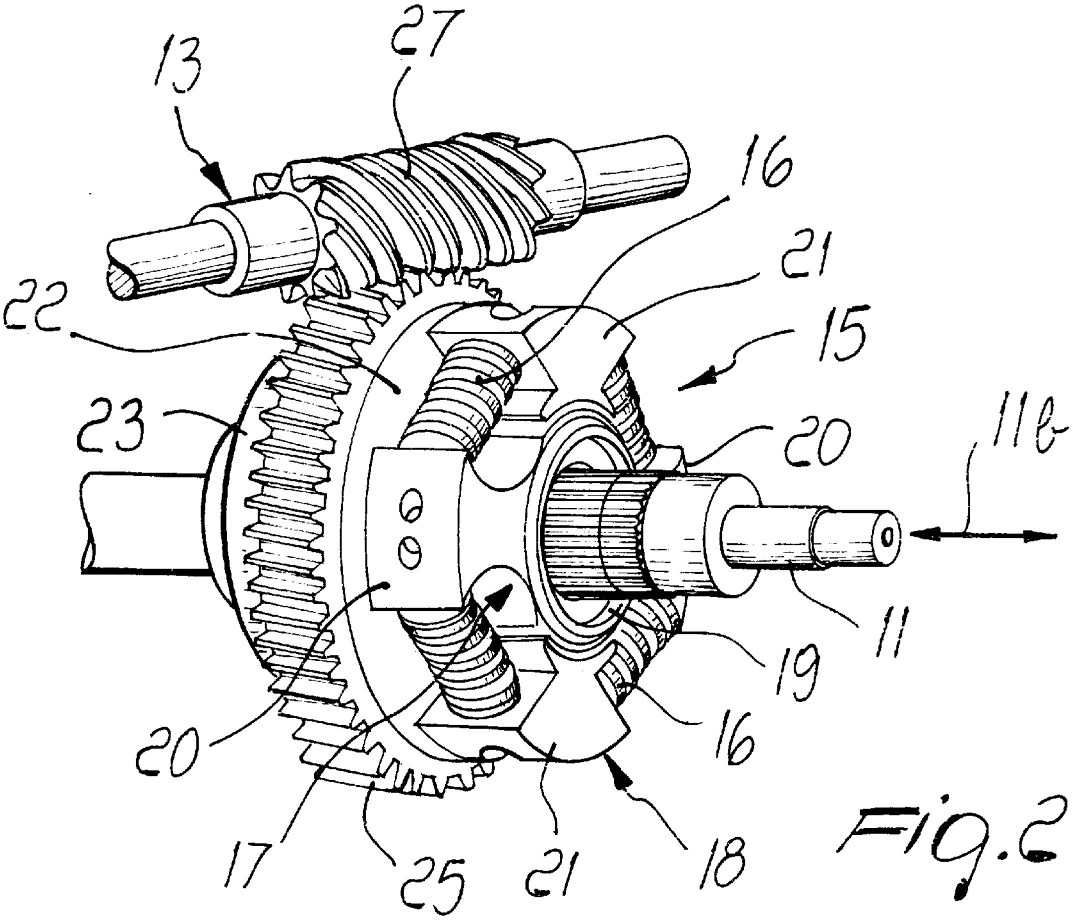
FIG. 2 is a perspective view of the elements located inside the device of FIG. 1.
Figure 3:
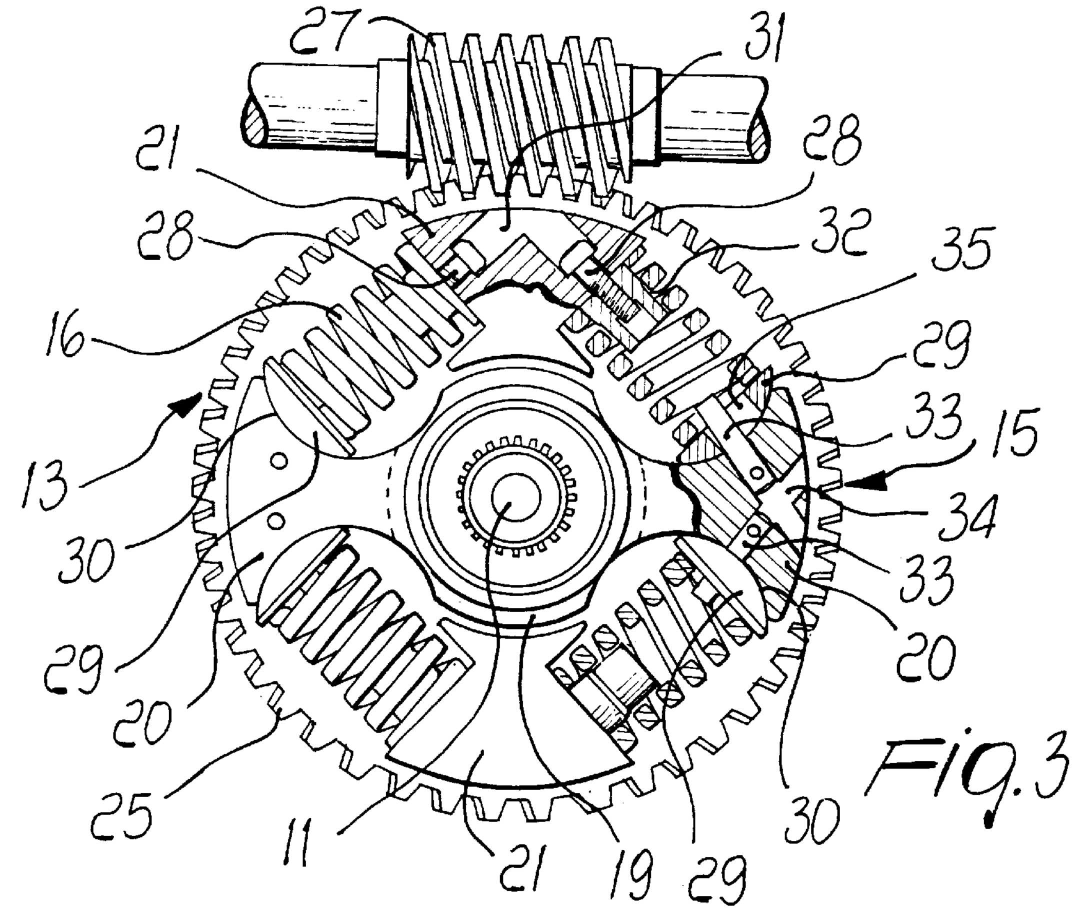
FIG. 3 is a front view of the elements of FIG. 2.
Figure 4:
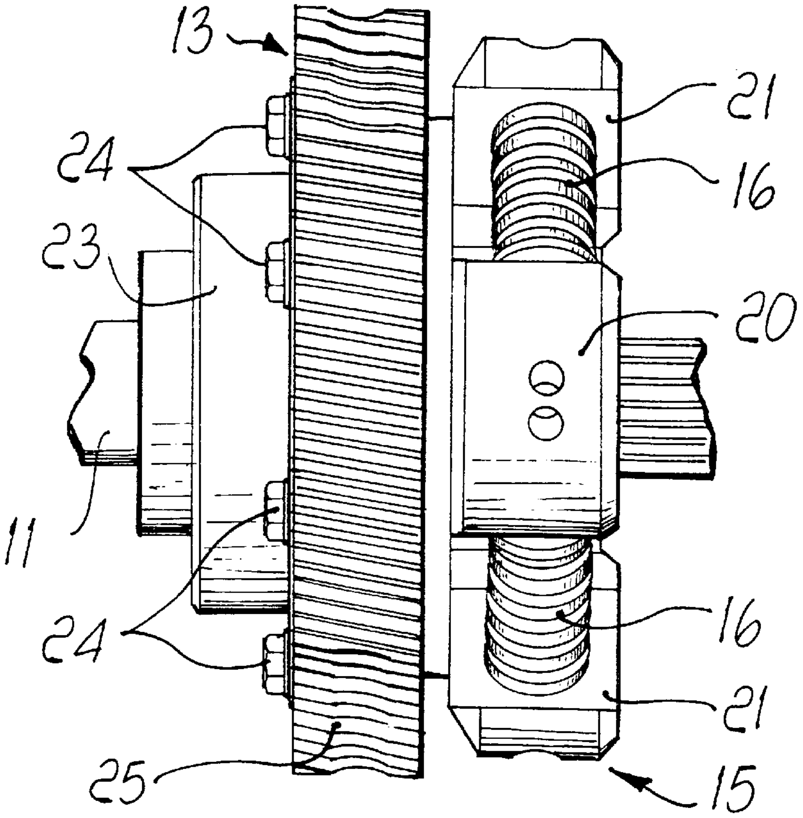
FIG. 4 is a side view of the elements of FIG. 2.
Figure 5:
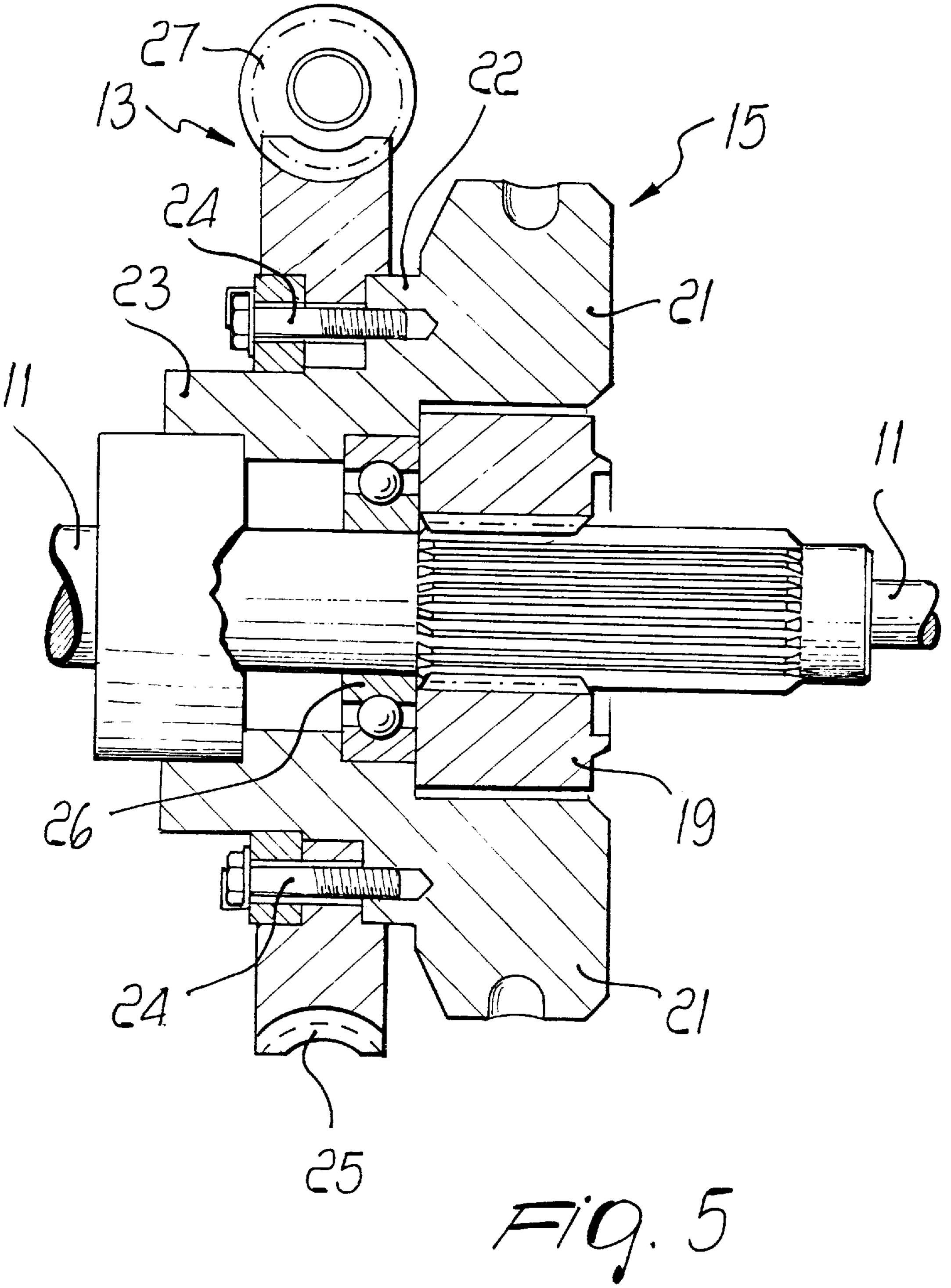
FIG. 5 is a sectional view of the elements of FIG. 2.

Said shaft 11 is subjected to a combined motion that includes a simple rotation, by means of a hydraulic motor 12 and of a worm gear reduction unit 13, and an alternating rotation of limited extent, by means of a torsional vibration generator 14 to which the shaft 11 is coupled, which coupling is graphically indicated by the reference numeral 11*b* in FIG. 2.

The simultaneous application of the simple rotation and of the alternating rotation to the shaft 11 is possible by means of a device 15 according to the invention that kinematically connects the reduction unit 13 to the shaft 11, allowing appropriately damped oscillations between them.

The device 15 described hereinafter comprises in this case four cylindrical helical springs 16 arranged in parallel pairs and in diametrically opposite positions so as to substantially surround the shaft 11.

The springs 16 are rigidly coupled between first supporting elements, generally designated by the reference numeral 17, and second supporting elements, generally designated by the reference numeral 18.

The first supporting elements 17 are constituted, in this case, by a rocker 19 with two arms 20 extending in opposite directions; said rocker 19 is rigidly coupled coaxially, by means of a splined coupling, to the shaft 11.

The second supporting elements 18 are constituted, in this embodiment, by extensions 21 extending axially, in diametrically opposite positions, from the flange-fitted end 22 of a shaped tubular element 23 that is fixed by means of bolts 24 to a ring gear 25 of the reduction unit 13.

The tubular element 23 and the ring gear 25 are coaxial to the shaft 11 upon assembly; the tubular element 23 is furthermore associated with said shaft 11 by bearing systems generally designated by the reference numeral 26.

The reduction unit 13 constituted by the ring gear 25 and by the worm gear 27 receives its driving motion from the hydraulic motor 12.

As regards the device 15, each one of the springs 16 has an end that is fixed to a corresponding extension 21 by means of a corresponding threaded element 28, whereas the other end is fixed to a dome-shaped part 29 that is slidingly coupled to an appropriately complementarily shaped region 30 of a corresponding one of the arms 20.

More specifically, the threaded element 28 accommodated in a corresponding seat 31 formed in the corresponding extension 21 (in this case, two seats 31 lying substantially at right angles to each other are formed in each wing 21), engages a bush 32 that is accommodated snugly and coaxially inside the respective spring 16.

Coupling between the dome-shaped part 29 and the corresponding complementarily shaped region 30 is ensured by a rod-like element 33 that is pivoted in a cavity 34 formed in the corresponding arm 20 and, upon assembly, is inserted in a hole 35 formed in the dome-shaped part 29, where said rod-like element 33, by having an end that can open in a fork-like manner, determines the anchoring of said end to the dome-shaped part 29.

In practice it has been observed that the above described device has achieved the intended aim and objects of the present invention.

Fatigue tests have in fact shown that parts breakages no longer occur.

In practice, the materials employed, so long as they are compatible with the contingent use, as well as the dimensions, may be any according to the requirements.

What is claimed is:

1. Device for subjecting a shaft to a combined simple rotation and alternating rotation of limited extent about its own axis, comprising elastic means that are arranged diametrically opposite with respect to said shaft that is coupled to a generator of torsional vibrations such that said generator of torsional vibrations subjects said shaft to a desired continuous alternating rotation of limited extent, said elastic means being rigidly coupled between first supporting elements that rotate with said shaft and second supporting elements that are rigidly coupled to a gear system that is freely mounted on said shaft and is coupled to means for actuating rotation of said shaft in combination with the desired continuous alternating rotation of limited extent provided by said generator of torsional vibrations.

2. Device according to claim 1, wherein said elastic means are constituted by cylindrical helical springs arranged in parallel pairs and located in diametrically opposite positions with respect to said shaft.

3. Device according to claim 1, wherein said first supporting elements are constituted by a rocker, with two arms extending in opposite directions, which is coupled coaxially to said shaft by a splined coupling.

4. Device according to claim 1, wherein said second supporting elements are constituted by extensions extending from said gear system.

5. Device according to claim 2, wherein said first supporting elements are constituted by a rocker, with two arms extending in opposite directions, which is coupled coaxially to said shaft by a splined coupling, and wherein said second supporting elements are constituted by extensions extending from said gear system, and wherein each one of said springs is arranged between a corresponding arm of said rocker and a corresponding extension.

6. Device according to claim 5, wherein each one of said springs has one end that is fixed to the corresponding said extension, and an other end connected and articulated to the corresponding said arm.

7. Device according to claim 6, wherein said other end of each one of said springs is fixed to a dome-shaped part that is in turn slidingly coupled to an appropriately complementarily shaped region of the corresponding said arm.

8. Device according to claim 1, wherein said gear system is constituted by a worm gear reduction unit.

9. Device according to claim 4, wherein said gear system is constituted by a worm gear reduction unit, and wherein said extensions constituting said second supporting elements extend from a flange-fitted end of a tubular element that is fixed to a ring gear of said worm gear reduction unit by means of bolts.

10. Device according to claim 9, wherein said tubular element is associated with said shaft by means of bearing systems.

11. Device according to claim 1, wherein said gear system is constituted by a worm gear reduction unit, and wherein said rotation actuation means are constituted by a hydraulic motor that is coupled to said worm gear reduction unit.

12. Device for subjecting a shaft to a combined simple rotation and alternating rotation of limited extent about its own axis, comprising elastic elements that are arranged diametrically opposite with respect to said shaft for being coupled to a generator of torsional vibrations such that said generator of torsional vibrations subjects said shaft to a desired continuous alternating rotation of limited extent, said elastic elements being rigidly coupled between first supporting elements that rotate with said shaft and second supporting elements that are rigidly coupled to a gear system that is freely mounted on said shaft and is coupled to a device for actuating rotation of said shaft in combination with the desired continuous alternating rotation of limited extent provided by said generator of torsional vibrations.

13. Device according to claim 12, wherein said elastic elements are constituted by cylindrical helical springs arranged in parallel pairs and located in diametrically opposite positions with respect to said shaft.

14. Device according to claim 12, wherein said first supporting elements are constituted by a rocker, with two arms extending in opposite directions, which is coupled coaxially to said shaft by a splined coupling, and wherein said second supporting elements are constituted by extensions extending from said gear system.

15. Device according to claim 13, wherein said first supporting elements are constituted by a rocker, with two arms extending in opposite directions, which is coupled coaxially to said shaft by a splined coupling, and wherein said second supporting elements are constituted by extensions extending from said gear system, and wherein each one of said springs is arranged between a corresponding arm of said rocker and a corresponding extension.

16. Device according to claim 15, wherein each one of said springs has one end that is fixed to the corresponding said extension, and an other end connected and articulated to the corresponding said arm, and wherein said other end of each one of said springs is fixed to a dome-shaped part that is in turn slidingly coupled to an appropriately complementarily shaped region of the corresponding said arm.

17. Device according to claim 12, wherein said gear system is constituted by a worm gear reduction unit.

18. Device according to claim 14, wherein said gear system is constituted by a worm gear reduction unit, and wherein said extensions constituting said second supporting elements extend from a flange-fitted end of a tubular element that is fixed to a ring gear of said worm gear reduction unit by means of bolts.

19. Device according to claim 18, wherein said tubular element is associated with said shaft by means of bearing systems.

20. Device according to claim 12, wherein said gear system is constituted by a worm gear reduction unit, and wherein said device for actuating rotation is constituted by a hydraulic motor that is coupled to said worm gear reduction unit.

* * * * *